Sept. 18, 1945.    P. W. HEINRICH    2,384,999
ELECTRODE HOLDER
Filed July 5, 1944    2 Sheets-Sheet 1
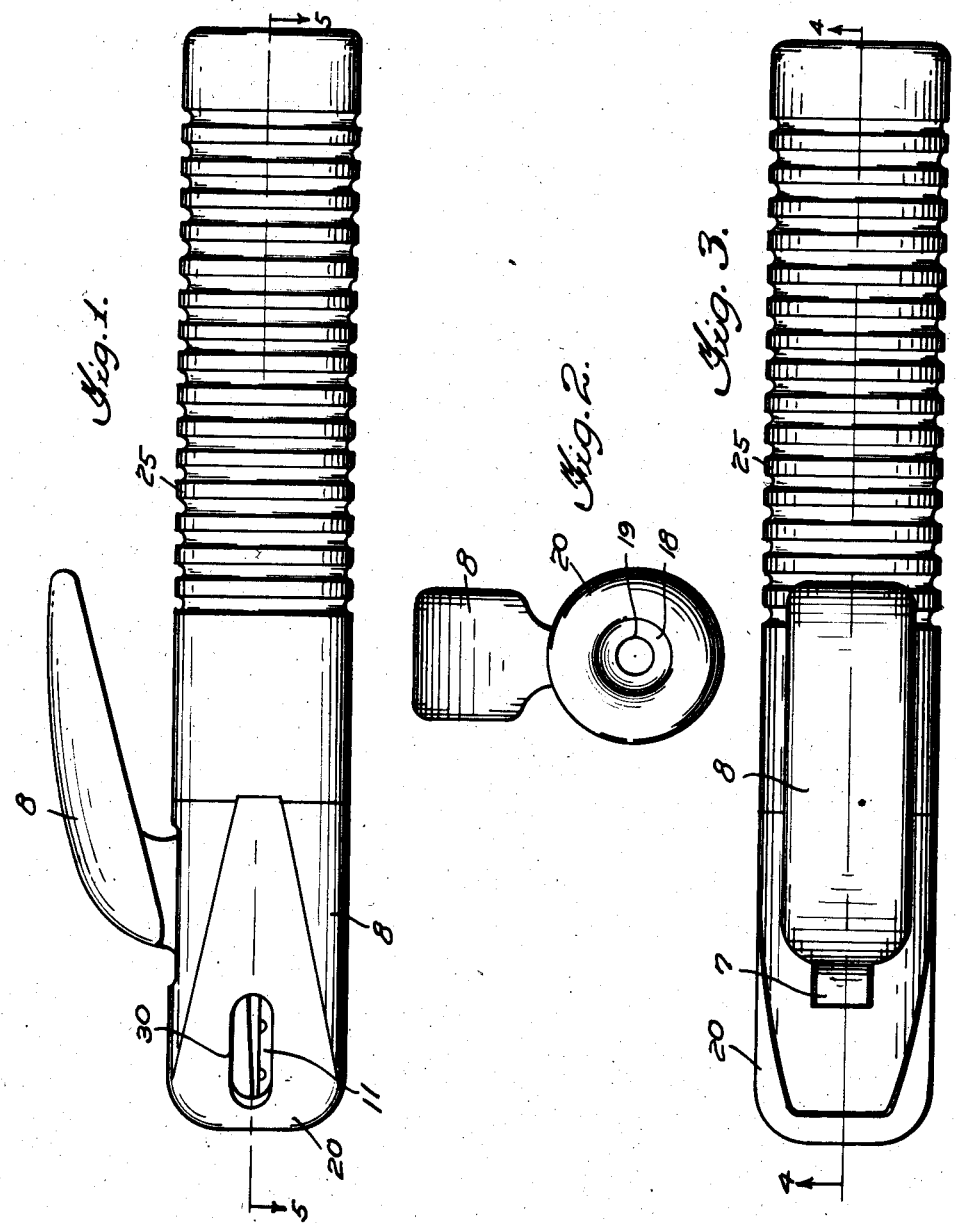
Inventor
PAUL W. HEINRICH,
By *Clarence A. O'Brien and Harvey B. Jacobson*
Attorneys

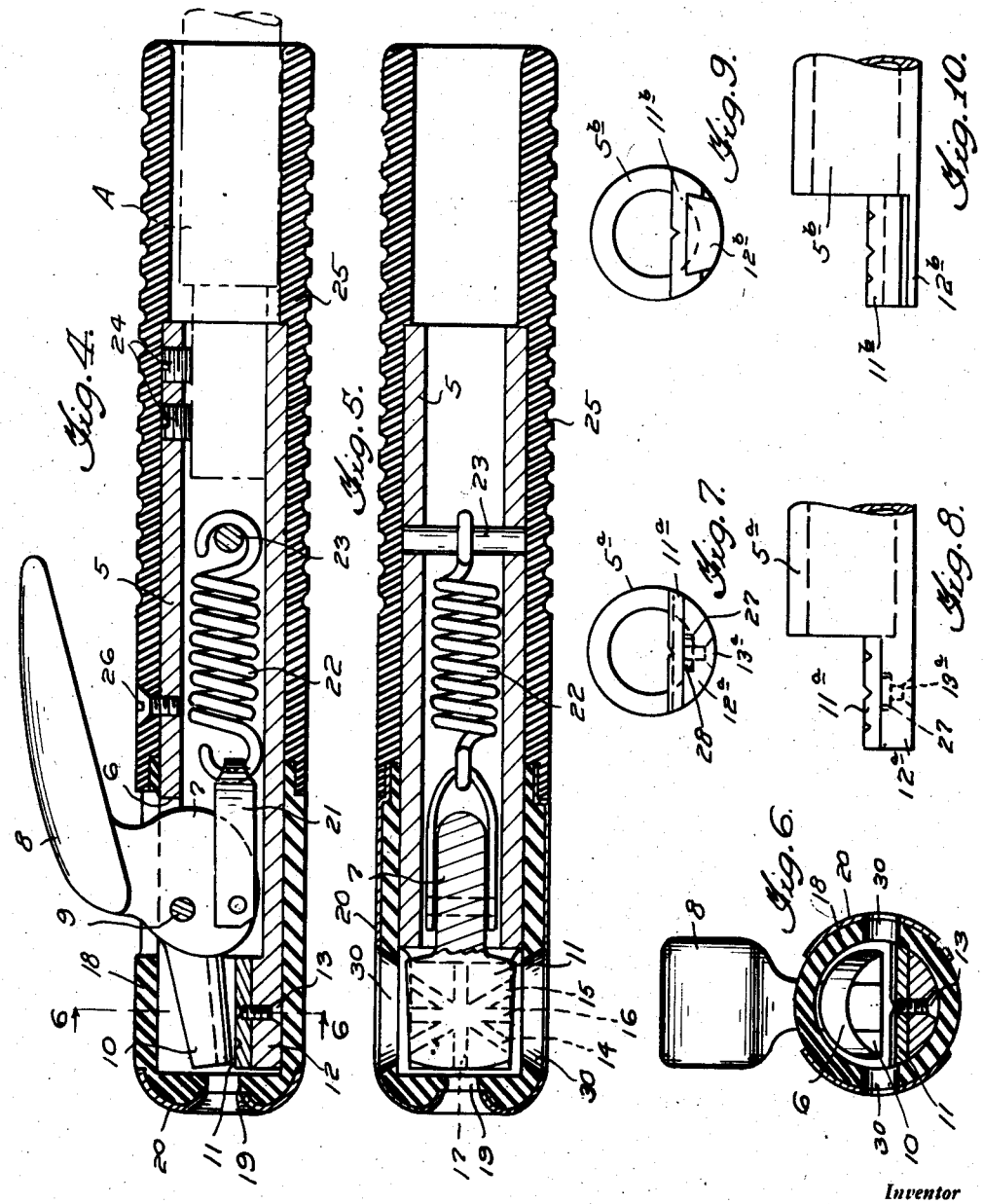

Patented Sept. 18, 1945

2,384,999

UNITED STATES PATENT OFFICE 2,384,999

ELECTRODE HOLDER

Paul W. Heinrich, Grosse Pointe Park, Mich.

Application July 5, 1944, Serial No. 543,508

2 Claims. (Cl. 219—8)

This invention relates to new and useful improvements in holders such as are employed for holding electrodes during welding operations.

The principal object of the present invention is to provide a holder adapted to hold electrodes at various angles to meet the convenience of the welder.

Another important object of the invention is to provide an electrode holder which is completely insulated for the purpose of safeguarding the welder from electric shocks, and protect all metal parts of holder from sparks, flash and spatter caused by electrode while in operation.

Other objects and advantages of the invention will become apparent to the reader of the following description.

In the drawings—

Figure 1 is a side elevational view of the implement.

Figure 2 is an end elevation looking at the forward end thereof.

Figure 3 is a top plan view.

Figure 4 is a longitudinal sectional view taken on the line 4—4 of Figure 3.

Figure 5 is a longitudinal sectional view taken on the line 5—5 of Figure 1.

Figure 6 is a cross-sectional view taken on the line 6—6 of Figure 4.

Figure 7 is an end elevational view of the stationary jaw.

Figure 8 is a fragmetary side elevational view showing the stationary jaw.

Figure 9 is an end elevational view showing a modification of the stationary jaw.

Figure 10 is a fragmentary side elevational view showing the modified stationary jaw.

Referring to the drawings wherein like numerals designate like parts, it can be seen that the holder is made up of an elongated barrel 5 having a slot 6 at one end thereof for receiving the cam head 7 of a hand lever 8 which is fulcrumed within the barrel 5 on a pin 9. The cam 7 has a forwardly projecting jaw 10 which is cooperative with a jaw piece 11 secured to a projecting portion 12 of the barrel 5.

Numeral 13 denotes a screw for holding the jaw piece 11 to the portion 12 and as can be seen in Figure 5, the jaw piece 11 has crossed grooves 14, 15, a transverse groove 16 and a longitudinally extending groove 17, these grooves intending to receive welding rods positioned at various angles.

The barrel 5 has a tubular extension 18 open at its forward end as at 19 to permit the insertion of one end of a welding rod. The tube 18 is of insulation material and has a metal annulus 20 at its forward end to protect the same against the flame during welding operations.

A clevis 21 is pivotally secured to the cam 7 and with this hooks one end of a tension spring 22 which extends rearwardly in the barrel 5 and hooks over a cross pin 23 in the barrel. The usual welding current line which in Figure 4 is denoted by reference character A can be secured in place by set screws 24.

An elongated tubular hand grip 25 of suitable insulation is secured to the barrel 5 by a screw or other means 26 and this hand grip 25 extends well rearwardly of the barrel 5 to enclose a portion of the insulation of the supply line A.

If desired, the stationary jaw may be constructed as shown in Figures 7 and 8 wherein the projection 12a of the barrel 5a has a recess 27 for receiving a boss 28 depending from a jaw piece 11a and a set screw 13a is disposed upwardly through the projection 12a and threadedly disposed into the boss 28.

A second modification of the stationary jaw is shown in Figures 9 and 10. The jaw is denoted by the reference character 11b and has a dovetail groove therein to permit the jaw to be disposed over a dovetailed-shaped extension 12b on the barrel 5b.

It can now be seen, that by depressing the hand lever 8, the jaw 10 is lifted and a welding rod can be inserted through the side opening 30 or through the front opening 19 and due to the varied dispositions of the grooves in the jaw piece, the welding rod can be set and held in any desired position. The rod is held by the releasement of the hand grip 8 so that the spring 22 rotates the cam 7 and forces the jaw 10 against the inner end of the welding rod.

The cam 7, hand lever 8 and forwardly projecting jaw 10 are of one piece of non-metallic material.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A welding rod holder comprising an elongated tube, a sleeve of insulation on the tube defining a hand grip, a tubular extension on the tube having a slot therein, a hand lever fulcrumed in the tube extension and projecting through said slot, a jaw carried by the hand lever, a spring for swinging the hand lever, a fixed jaw and diagonal grooves on the jaw, said tubular extension being provided with a protective shield of the forward end thereof, said tubular extension being provided with a welding rod receiving opening extending through the same and through said protective shield.

2. A welding rod holder comprising an elongated tube, a sleeve of insulation on the tube defining a hand grip, a tubular extension on the tube having a top slot therein, a hand lever fulcrumed in said extension and projecting through said slot, a jaw carried by the hand lever within and enclosed by said extension, a fixed jaw with diagonal grooves within said extension and enclosed thereby, said tubular extension being provided with a protective shield at the forward end thereof and having a front and opposed side openings extending through the same and through said protective shield for selective use in inserting a welding rod into the extension into alignment with said grooves.

PAUL W. HEINRICH.